Jan. 26, 1954 J. S. YOUTCHEFF 2,667,110
CAMERA AND FILTER SUPPORT FOR STEREOSCOPIC PHOTOGRAPHY
Filed July 19, 1951
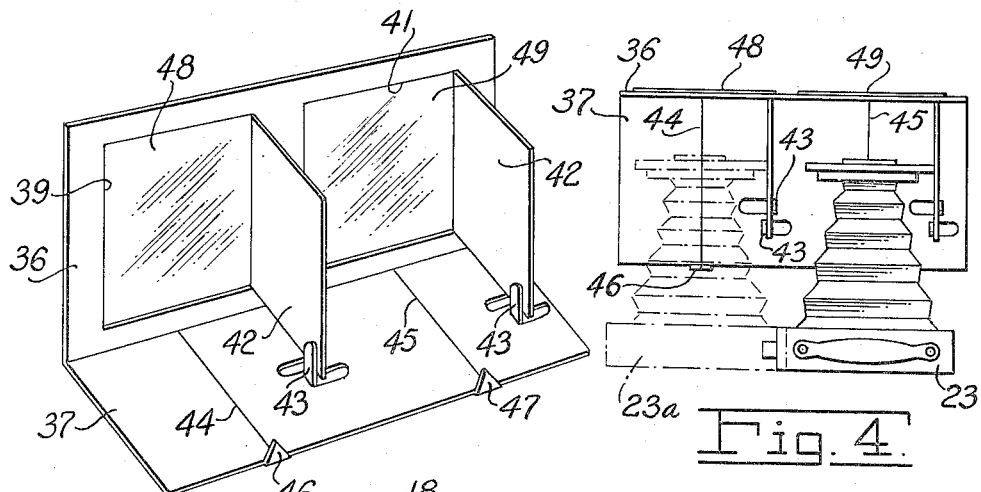
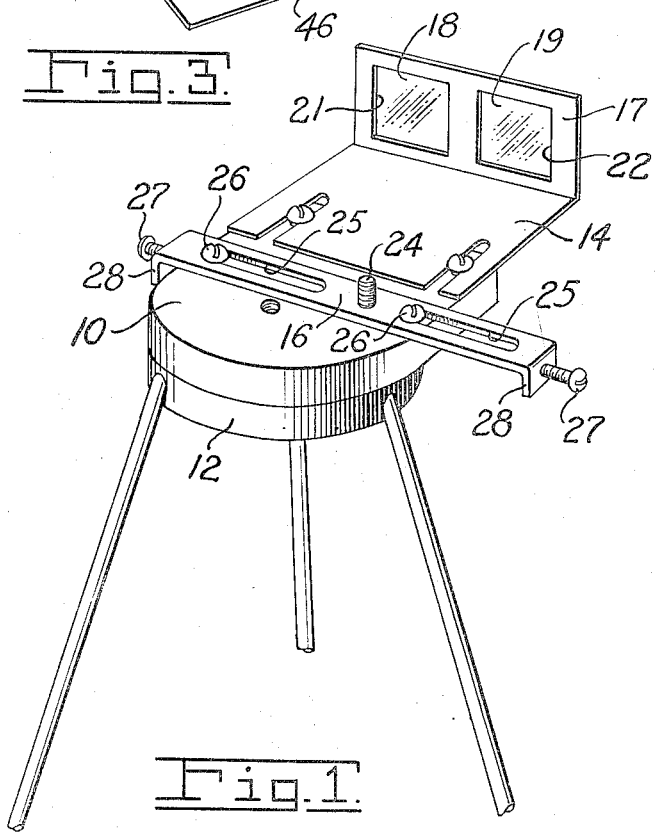
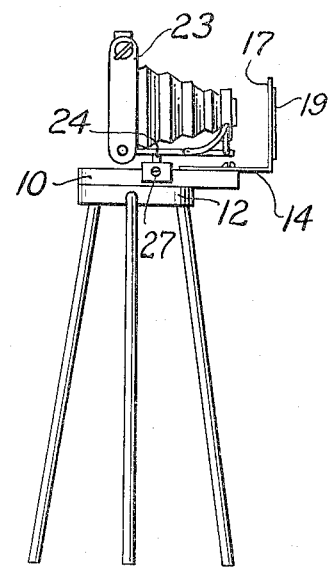
INVENTOR.
JOHN S. YOUTCHEFF
BY
Zugelter & Zugelter
Attys.

Patented Jan. 26, 1954

2,667,110

UNITED STATES PATENT OFFICE 2,667,110

CAMERA AND FILTER SUPPORT FOR STEREOSCOPIC PHOTOGRAPHY

John Sheldon Youtcheff, Santa Monica, Calif.

Application July 19, 1951, Serial No. 237,547

1 Claim. (Cl. 95—11)

This invention relates to an attachment or accessory for a camera which makes it possible to take stereoscopic views with an ordinary camera and to a method of taking stereoscopic pairs of images.

An object of this invention is to provide a device by means of which a stereoscopic pair of images may be exposed on a single frame of color sensitive film.

A further object of this invention is to provide a device by means of which a stereoscopic pair of contrasting colors can be made on a single frame of color sensitive film.

A further object of this invention is to provide a device that can be attached to the ordinary camera, which contains a pair of colored panels of contrasting colors whose centers are spaced at interocular distance and means for positioning the camera behind said panels with the center of the lens in alignment with the respective centers of the panels so that a stereoscopic pair of images of contrasting colors can be exposed on a frame of film in the camera.

A further object of this invention is to provide a method of taking a stereoscopic pair of images on a single frame of film.

The above and other objects and features of the invention will in part be apparent and will in part be obvious from the following detailed description, and the drawing, in which:

Figure 1 is a perspective view showing an attachment constructed in accordance with an embodiment of this invention;

Fig. 2 is a view in side elevation showing a device embodying the invention in operative relation to a camera;

Fig. 3 is a perspective view showing a modified form of device embodying the invention; and Fig. 4 is a top plan view of the device shown in Fig. 3, a camera being shown in association therewith.

In the following detailed description, and the drawing, like reference characters indicate like parts.

In Figs. 1 and 2 is shown a device which includes a platform 10 adapted for mounting on a tripod 12. The platform forms a support for a panel frame 14 and a sliding carriage 16.

Frame 14 includes an upstanding filter supporting panel 17. Filter panels 18 and 19 are mounted in windows 21 and 22, respectively. The windows are cut from the filter supporting panel and are spaced substantially an interocular distance on centers.

Sliding carriage 16 carries a camera 23 (Fig. 4). The camera is attached thereto by means of a stud 24. Stud 24 may be a part of the carriage. The carriage is slotted, as indicated at 25, and is held on platform 10 by screws 26. Screws 26 pass through the slots so that the carriage can slide back and forth on the platform with the camera. Adjustment screws 27 limit the distance that the camera and carriage can slide back and forth to properly position the camera so that when the camera and carriage are at the limit of their movement in either direction, the camera is directed through one of the filter panels. The adjustment screws are threaded in downwardly extending flanges 28 at the ends of carriage 16 and can engage the sides of platform 10 to limit sliding movement of the carriage.

The camera moves back and forth with the carriage behind colored filter panels 18 and 19 (Fig. 1). The camera is directed through the center of panel 18 when at the limit of movement of the carriage in one direction and is directed through the center of panel 19 when at the limit of carriage movement in the other direction, and the camera moves substantially an interocular distance between these positions.

The panels are formed of transparent material of contrasting and substantially complementary colors. For example, panel 18 may be formed of red glass or the like while panel 19 is formed of blue-green glass or the like so that the camera can take a first image through the red panel and a second image through the blue-green panel. The camera is provided with a color sensitive film upon which the images are formed. Both images are formed on a single frame of film so that, upon development, the frame has a red image and a blue-green image taken from two spaced positions. The distance that the camera is moved is set at an interocular distance so that a stereoscopic pair of images is formed on a single frame. However, the images are of contrasting and substantially complementary colors. The images can be viewed through a viewer which is a pair of glasses formed of panels of the same colors as the panels 18 and 19 so that each image is seen by only one eye. The glasses are arranged so that the image formed through the lefthand filter panel 18 is viewed with the left eye and the image formed through the right hand filter panel is viewed with the right eye. The film, in the form of a color transparency, may be projected on a screen for viewing or may be formed into a color print which can be viewed directly with the glasses.

In Figs. 3 and 4 is shown an accessory constructed in accordance with a second embodiment of the invention. This accessory includes a backing member of thin sheet material including two elongated panels 36 and 37. Panels 36 and 37 meet at a right angle. As shown in Fig. 4, panel 37 forms a camera guide. Panel 36 contains a pair of spaced rectangular windows 39 and 41 (see Fig. 3). At one edge of each window, a guide panel 42 extends rearwardly from panel 36. The guide panels are formed of the material of panel 36 which is cut away to provide for the windows. Guide panels 42 extend perpendicular to panels 36 and 37 and are held in place by means of small tabs 43 cut from the material of panel 37. The tabs extend upwardly from panel 37 and engage opposite sides of the guide panels.

The guide panels are spaced an interocular distance so that, when the camera is moved from the position shown in full lines at 23 in Fig. 4 to the position shown in dot-dash lines at 23a the camera is moved an interocular distance. In each of these positions, however, the same side of the lens mounting on the camera engages one of the guide members so that the guide members guide the camera and the camera is moved an interocular distance. In addition, lines 44 and 45 (Fig. 3) are ruled on the panel 37 to properly direct the camera when in each of those positions. Guide tabs 46 and 47 are provided along the edge of panel 37 opposite panel 46 to aid in properly positioning the camera.

Windows 39 and 41 contain colored transparent members 48 and 49, respectively, of contrasting and substantially complementary colors so that a stereoscopic pair of images of contrasting colors can be taken through the windows.

The camera employs ordinary color senitive film of the type generally available. This film is sensitive to all visible colors. The type of film known as "Kodachrome" is suitable. The film can be developed and processed in the usual manner without need for special equipment to form a frame containing a stereoscopic pair of images of contrasting and substantially complementary colors. These images can then be viewed through a simple pair of glasses each of which is colored to transmit only one of the images.

Having described my invention, what I claim as new and desire to secure by Letters Patent is:

An adaptor for cameras by means of which a camera may be used to take stereoscopic pictures on colored film, said adaptor having a flat base for mounting on a support, a wall member at the front edge of the support at right angles thereto, said wall member having a pair of apertures therein, the centers of which are spaced an interocular distance, said apertures being provided with filters of contrasting colors, means on said base for lining up the axis of the camera with said filters, and spaced guide walls extending rearwardly from the wall containing said filters, said guide walls being spaced an interocular distance and serving to locate the camera when focused through one filter an interocular distance away from the center of the other filter.

JOHN SHELDON YOUTCHEFF.

References Cited in the file of this patent

UNITED STATES PATENTS

| Number | Name | Date |
|---|---|---|
| 1,371,348 | Prucha | Mar. 15, 1921 |
| 2,360,322 | Harrison | Oct. 17, 1944 |
| 2,568,327 | Dudley | Sept. 18, 1951 |

FOREIGN PATENTS

| Number | Country | Date |
|---|---|---|
| 328,177 | France | Dec. 19, 1903 |
| 12,891 | Great Britain | of 1911 |